(12) United States Patent
Alameldeen et al.

(10) Patent No.: US 8,276,142 B2
(45) Date of Patent: Sep. 25, 2012

(54) HARDWARE SUPPORT FOR THREAD SCHEDULING ON MULTI-CORE PROCESSORS

(75) Inventors: Alaa R. Alameldeen, Hillsboro, OR (US); Zeshan A. Chishti, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 384 days.

(21) Appl. No.: 12/587,597

(22) Filed: Oct. 9, 2009

(65) Prior Publication Data

US 2011/0088041 A1 Apr. 14, 2011

(51) Int. Cl.
*G06F 9/46* (2006.01)
(52) U.S. Cl. ............. 718/100; 718/1; 718/102; 718/104
(58) Field of Classification Search ........................ None
See application file for complete search history.

(56) References Cited

U.S. PATENT DOCUMENTS

| 7,200,522 | B2 | 4/2007 | Mericas | |
|---|---|---|---|---|
| 7,548,832 | B2 | 6/2009 | Mericas | |
| 2004/0194055 | A1* | 9/2004 | Galloway et al. | 717/101 |
| 2007/0260895 | A1* | 11/2007 | Aguilar et al. | 713/300 |
| 2009/0288092 | A1* | 11/2009 | Yamaoka | 718/104 |
| 2010/0058346 | A1* | 3/2010 | Narang et al. | 718/102 |
| 2010/0191854 | A1* | 7/2010 | Isci et al. | 709/226 |

* cited by examiner

*Primary Examiner* — Emerson Puente
*Assistant Examiner* — Dong Kim
(74) *Attorney, Agent, or Firm* — Blakely, Sokoloff, Taylor & Zafman LLP

(57) ABSTRACT

A method, device, and system are disclosed. In one embodiment the method includes scheduling a thread to run on first core of a multi-core processor. The determination as to which core the thread is scheduled on uses one or more processes. These processes may include ranking all of the cores specific to a workload of the thread, establishing a current utilization of each core of the multi-core processor, and calculating an inter-core migration cost for the thread.

23 Claims, 3 Drawing Sheets

HARDWARE SUPPORT FOR THREAD SCHEDULING ON MULTI-CORE PROCESSORS

FIELD OF THE INVENTION

This invention relates to scheduling threads on a multi-core processor system.

BACKGROUND OF THE INVENTION

Multi-core processor architectures are becoming widely adopted in both server and client platforms. These multi-core architectures are designed to run multiple workloads simultaneously on different hardware threads. Operating systems in multi-core processor based systems make scheduling decisions independent of hardware considerations since most multi-core or multiprocessor systems are homogenous. However, the industry is moving toward more variability between different cores in a single system. Significant performance penalties may be paid if threads are scheduled independently of any hardware considerations among cores.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a method, device, and system for hardware support for thread scheduling on a multi-core processor are described.

A thread scheduling device residing in a multi-core processor may utilize some or all of a number of tools to determine whether a thread should be scheduled on a given core in the processor. Included among these tools are usage counters per core to determine whether each core in the multi-core processor is idle or busy, a core rank map to determine the ranking of all cores based on a given evaluation metric (like performance or power), the workload characteristics of the thread to determine what particular metric in the core rank map to utilize, and the priority level of the thread, among other tools. Using the set of tools provided, the thread scheduling device may provide a core ID of the best core among all the cores in the multi-core processor to schedule the thread on. This core ID may be provided to the OS for further use.

Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment. In the following description and claims, the terms "include" and "comprise," along with their derivatives, may be used, and are intended to be treated as synonyms for each other.

Figure 1:
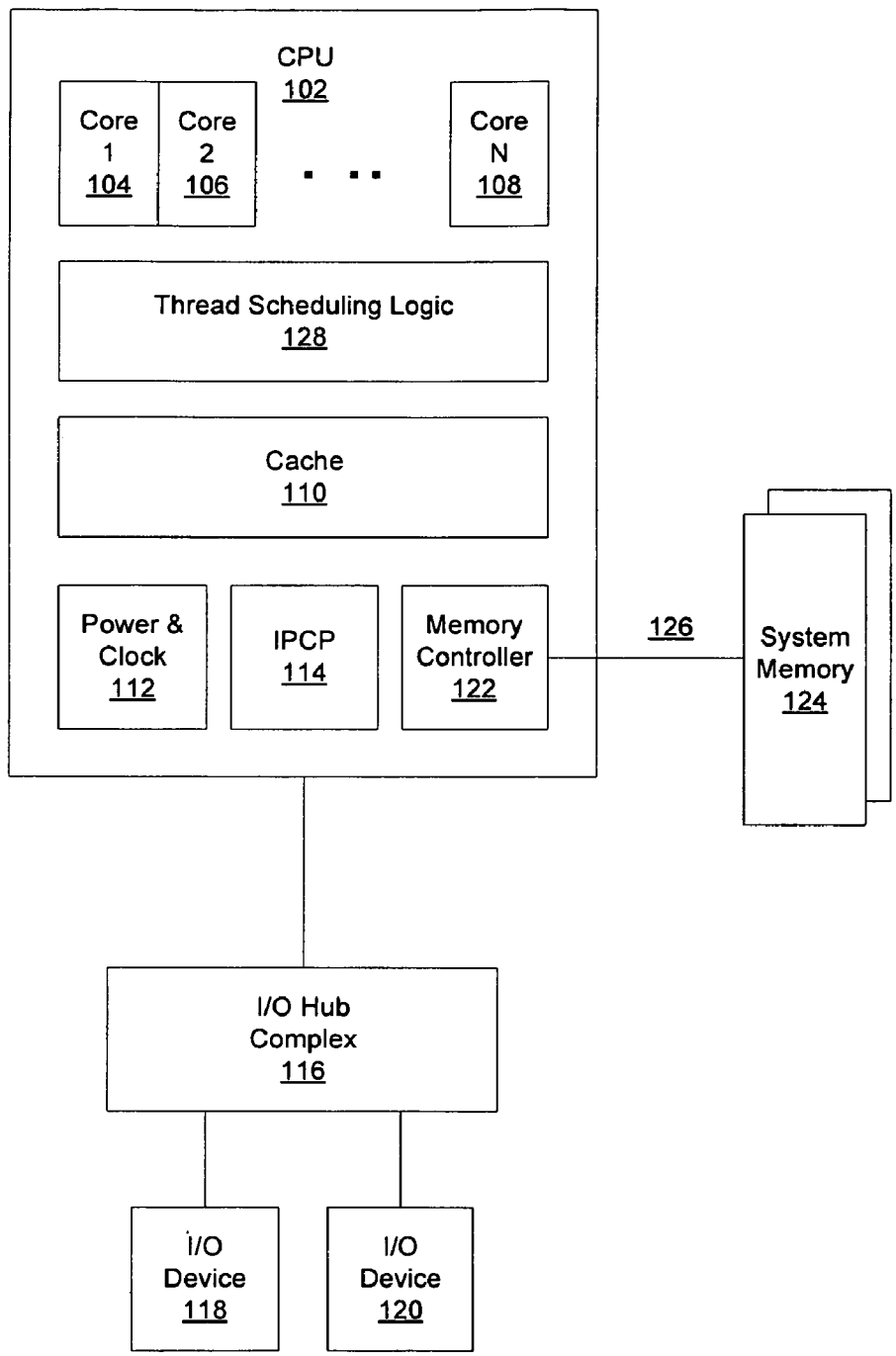
FIG. 1 illustrates an embodiment of a general purpose computer system with hardware support for thread scheduling.

FIG. 1 illustrates an embodiment of a general purpose computer system with hardware support for thread scheduling.

Computer system 100 is shown. The computer system may be a desktop, server, workstation, laptop, handheld, television set-top, media center, game console, integrated system (such as in a car), or other type of computer system. In several embodiments the computer system 100 includes a central processing unit (CPU) 102. The CPU 102 may be an Intel® Corporation CPU or a CPU of another brand. The CPU may include more than one core. In fact the CPU 102 may contain N cores of which core 1 (104), core 2 (106), and core N (108) are shown. Potentially, N may be any number greater than one. In many embodiments, each core (such as core 1 (104)) includes internal functional blocks such as one or more execution units, retirement units, a set of general purpose and specific registers, etc. If cores such as core 1 (104), core 2 (106) or core N (108) are multi-threaded or hyper-threaded, then each hardware thread is considered as a core for the purposes of this invention.

CPU 102 may also include a cache 110. In different embodiments the cache may be apportioned in different ways. Cache 110 may be one of many different sizes in separate embodiments. For example, cache 110 may be an 8 megabyte (MB) cache, a 16 MB cache, etc. Additionally, in different embodiments the cache may be a direct mapped cache, a fully associative cache, or a multi-way set-associative cache. The cache may include one large portion shared among all cores or may be divided into several separately functional slices (e.g., one slice for each core). The cache may also include one large portion shared among all cores and one portion that is divided into several separately functional slices.

CPU 102 also includes a power and clock unit 112 that supplies power to the CPU 102 and provides a reference clock signal for the circuitry residing on CPU 102. Furthermore, CPU 102 may also include an Interconnect Protocol and Coherence Processing (IPCP) unit 114, e.g., a unit implementing the QuickPath Interconnect (QPI) protocol. IPCP unit 114 enables communication between CPU 102 and any other CPUs. Additionally, IPCP unit 114 or another communication block that is not shown may also allow communication between CPU 102 and I/O hub complex 116. I/O hub complex 116 may include one or more I/O host controllers (not shown). The I/O host controllers provide an interface for communication between one or more I/O devices, such as I/O devices 118 and 120, and the rest of computer system 100.

CPU 102 also may include a memory controller 122 to provide an interface to communicate with system memory 124 across processor-memory interconnect 126. In other embodiments that are not shown, memory controller 122 may be a discrete device or integrated within another device within computer system 100.

System memory 124 may comprise dynamic random access memory (DRAM), such as a type of double data rate (DDR) DRAM, non-volatile memory such as flash memory, phase change memory (PCM), or another type of memory technology. The system memory 124 may be a general purpose memory to store data and instructions to be operated upon by CPU 102, other CPUs within computer system 100, and potentially other devices within computer system 100 (e.g., a direct memory access (DMA)-capable I/O device).

Processor-memory interconnect 126 may include one or more optical, metal, or other wires (i.e. lines) that are capable of transporting data, address, control, and clock information.

Additionally, CPU 102 includes thread scheduling logic 128 to manage the scheduling of threads running on each core (e.g., core 1 (104), core 2 (106), etc.). The thread scheduling logic includes several functional blocks and state information to efficiently schedule each thread on one of the several cores (core 1 (104) through core N (108)).

Figure 2:
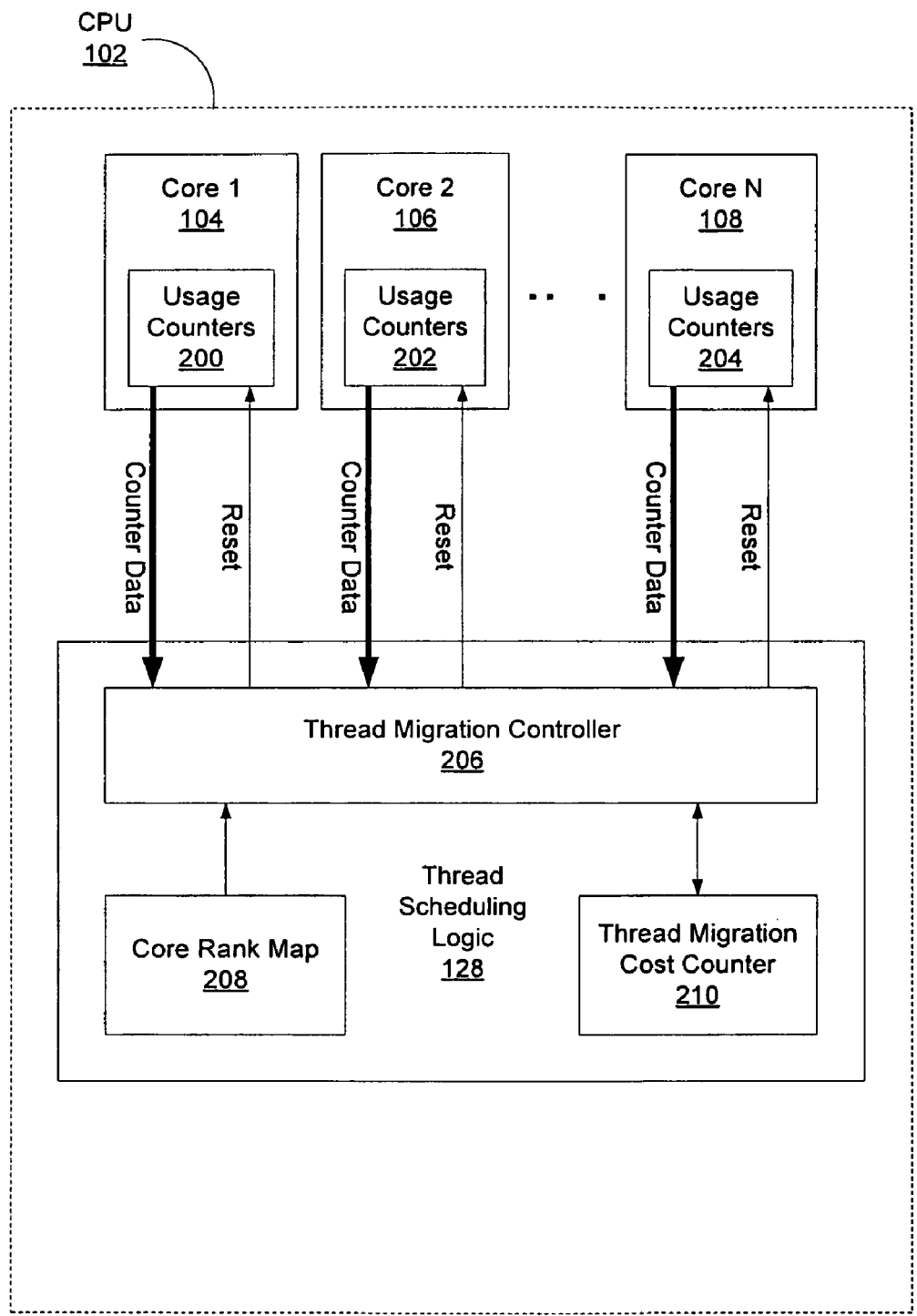
FIG. 2 illustrates a detailed view of an embodiment of the thread scheduling logic.

FIG. 2 illustrates a detailed view of an embodiment of the thread scheduling logic.

Each core in CPU 102 includes one or more usage counters. E.g., core 1 (104) includes usage counters 200, core 2 (106) includes usage counters 202, and core N (108) includes usage counters 204. Each usage counter may indicate core activity. Usage counters may comprise one or more performance monitor counters or may be implemented separately from performance monitor counters. The activity of a core may be quantified by one or more metrics (i.e. events) such as the number of instructions committed, cache accesses, branch mispredictions, instructions retired, etc. In many embodiments, each usage counter counts one event where each time the event takes place the usage counter is incremented. In other embodiments, a usage counter may count more than one event to measure an aggregate of several events where each time any one of the several events takes place the usage counter is incremented. Additionally, in some embodiments, a combination of two usage counters may be utilized to monitor a ratio.

The usage counters can determine the utilization of the core in question. In other words, the utilization of a core is regarding whether the core is idle or busy, and if busy then how busy. In some embodiments, the usage counters may be even more varied and additionally report what types of instructions are being performed, such as basic integer operations, floating point operations, special instructions such as single instruction, multiple data (SIMD) instructions, as well as potentially other useful information.

A thread migration controller 206, located within thread scheduling logic 128, includes logic to monitor the usage counter(s) for each core. In some embodiments, at certain time intervals the current values in the usage counters for each core are reported to the thread migration controller 206. In other embodiments, the thread migration controller 206 can send a reset signal to a core's usage counters, which causes a core to report the current values of the one or more usage counters to the thread migration controller 206. Once the values are sent to the thread migration controller 206, the usage counters for the core may be reset.

There may be a pre-determined threshold value for a given usage counter to indicate processor activity. For example, if a usage counter is counting instructions committed, then once the counter counting instructions committed passes a threshold value within a sample time window, this would indicate the core is active. On the other hand, if the counter does not reach the threshold value, this result assumes that the core is inactive. This threshold value may be significantly above a zero value to eliminate a false activity reading based on potential internal maintenance activities within the core. These maintenance activities might result in one or more usage counters registering events but not to the extent that would indicate significant workload activity. In many embodiments, the sampling intervals are pre-determined in hardware.

If the usage counter is reporting that a given core is below the activity threshold, the core is then assumed to be inactive and would therefore be a candidate to have a thread scheduled on it.

In many embodiments, a core rank map 208 located within thread scheduling logic 128, provides core rank information to the thread migration controller 206. The core rank map 208 contains a pre-established ranking of all cores in the multi-core processor. For a heterogeneous multi-core system, cores can be ranked by issue width, clock speed, power, or any relevant metric or combination of metrics. For a homogenous multi-core processor, cores can be clocked at different frequencies or have different power settings, and that order is reflected in the core rank map 208.

In some embodiments, the core rank map 208 includes a single table that ranks the cores according to one pre-established metric or combination of metrics. In other embodiments, the core rank map 208 includes several tables, one for each of several metrics. When there are several tables in the core rank map 208, each table provides a ranked list of cores for one of the metrics (or a combination of metrics). For a given thread, the thread migration controller 206 may pick one or more of the ranked lists to use for scheduling the thread. For example, the priority for scheduling a thread may be based on power consumption and one core may provide better power savings than the other cores (potentially due to the core running at a lower frequency or voltage than other cores). If the core that can save more power is not active, the thread migration controller 206 may schedule the thread on the more power conserving core. Another example might be a floating point intensive thread that is scheduled on the core ranked highest in floating point computation ability.

In many embodiments, the process that takes place would start with a thread needing to be scheduled on a core. The thread may have particular properties (E.g. floating point intensive calculations, low priority work, etc.) and those properties may be utilized to determine one or more ranked lists to use from the core rank map 208. Once the ranked list is determined, the thread migration controller 206 finds the core ranked at the top of the list and checks to see whether that core is active or idle through usage counters. If the top ranked core is idle, the thread may then be scheduled on that core. Otherwise the thread migration controller 206 may check to see if the thread currently running on the top ranked core should be moved off that core to make room for the new thread to be scheduled.

A number of factors may be used to determine which thread should be scheduled on the top ranked core (i.e. the current thread or the new thread). Factors used in the determination of which thread should be scheduled on the top ranked core may include the relative priorities of the threads, the types of workloads the threads are executing, the cost in lost computational time incurred by moving the current thread out and the new thread in to the top ranked core, etc. For a given core there may be a thread currently running on the core and one or more other threads that may desire to be scheduled on the core. The term "new" thread, as mentioned above, does not necessarily mean the thread has just come into existence, although this is a possibility. Rather, "new" simply means the thread is not the current thread running on the core.

If the current thread is pushed out of the top ranked core due to the scheduling of the new thread, then it will require a rescheduling process performed for itself. The remaining list of cores is traversed. Although, since the displaced thread may have an entirely different type of workload, priority, etc. the ranked list of cores might change for this different thread. Otherwise, if the current thread retains priority with the top ranked core, then the process of scheduling the new thread continues by moving down to the next core on the ranked list and checking that core for availability. In some embodiments, the ranked list is traversed until a core is found that satisfies the workload requirements and is free. If all cores in the CPU 102 are executing threads and all the threads for all the cores have a higher priority than the new thread, then the new thread may wait in a queue for a core to finish work on a thread and become idle.

The thread migration controller 206 may go through this process for a thread that is initially being scheduled for the first time (e.g. a new process that utilizes a single thread starts up in the computer system). Additionally, this process may take place on threads already running in the system to reschedule one or more threads to different cores for efficiency purposes. For example, at a given time interval, the thread scheduling logic 128 may initiate a thread scheduling process that traverses through each thread currently running in the computer system to determine whether all the threads are running on a core that matches up well with their respective workloads.

Many times there will not be an idle core available for a new thread or a core ranked at the top of the core rank map 208 for a particular metric will be busy. In these cases, it may become important to perform a cost-benefit analysis for migrating one or more threads from a first core to a second core. For example, if there are two cores in CPU 102 and a thread currently idle or running on the first core would be better served by running on the second core, the cost of migrating the thread may be calculated and weighed against the potential benefit of running the thread on the more efficient core. In many embodiments, a thread migration cost counter 210 is located within thread scheduling logic 128. In some embodiments, the thread migration cost counter 210 may track the average cost of thread migration. In some embodiments, the thread migration cost counter 210 may determine an average time (e.g. a number of clock cycles) from the beginning of a thread's migration until the thread starts executing on the new core.

To track the average thread migration time, the thread migration cost counter 210 may start a timer each time the thread migration controller 206 indicates a thread has begun to migrate. Once the thread has completed migration the timer may be read and the value saved. In many embodiments, the timer value may include an aggregate amount of time of all thread migrations. This may then be divided by the total number of threads that have migrated to get an average migration time.

In other embodiments, the thread migration cost counter 210 may track migration on a per thread basis. Thus, each thread may have a master migration time counter that aggregates all migration times and divides by the number of migrations for each given thread. In yet other embodiments, additional average migration time values may be stored per core. For example, per core, the average time threads have taken to migrate to the core may be stored and/or the average time threads have taken to migrate from the core may be stored.

These thread migration cost counter values, whether they are average thread migration cost values, per thread migration cost values, or per core thread migration cost values, may be utilized by the thread migration controller for help in determining whether it is beneficial for a given thread to migrate to a given core. For a given thread, the thread migration controller 206 may associate a value with a thread (the thread's relative priority vs. other threads), then determine the thread workload. If the thread has a light workload, such as if the thread is running a print spool, then the higher ranked core may be one that runs at lower power consumption (since performance is not a priority). On the other hand, if the thread has a heavy workload, such as if the thread is running an intensive 3D rendering or real-time physics workload, then the higher ranked core may be one that is higher performing for those types of workloads.

When a scheduling decision needs to be made, an operating system running on the computer system may query hardware (via a special instruction). At that time, the thread migration controller 206 uses inputs from the usage counters, the core rank map, thread migration cost information, thread priority information, and thread workload (i.e. activity) information to determine which core to schedule a thread on. The controller calculates whether the benefit from migrating a thread (computed from the rank map and activity information) outweighs the cost (computed from the thread migration cost counter), and the outcome provides the operating system with the core ID for the core where a thread can be migrated to, or a special value (e.g., −1) if no cores can be found to match needed scheduling criteria.

Figure 3:
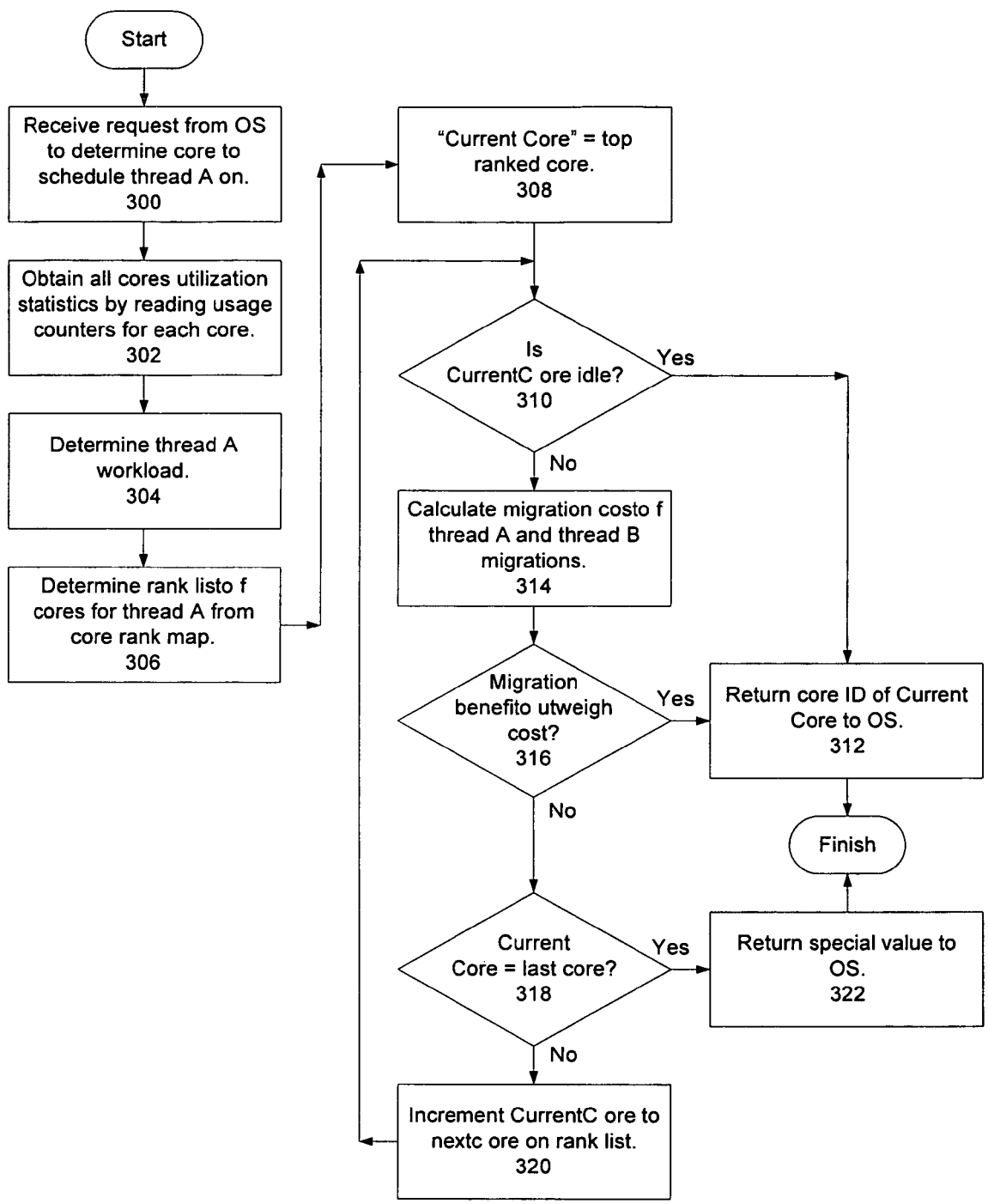
FIG. 3 is a flow diagram of an embodiment of a process to schedule a thread on a multi-core processor.

FIG. 3 is a flow diagram of an embodiment of a process to schedule a thread on a multi-core processor.

The process is performed by logic which may comprise hardware (e.g., circuitry in a processor) or firmware (e.g., basic input/output system (BIOS) or microcode routines), combination of the two. The process begins by processing logic receiving a request to determine which core in a multi-core processor to schedule thread A on (processing block 300). This request may come from an OS routine through a special thread scheduling instruction.

Once the request has been received, then processing logic obtains the utilization statistics of all cores by reading the usage counters for each core (processing block 302). The usage counters at a minimum provide processing logic with information as to whether each core is idle or not. In some embodiments, the usage counters are read by processing logic once the request from the OS is made. In other embodiments, processing logic queries the usage counters after a repeating time interval and keeps a relatively fresh running tally of the usage counters to have the information already stored when an OS thread scheduling request is received.

Next, processing logic determines the workload of thread A (processing block 304). This workload may have certain priorities such as a high performance priority or a low power consumption priority. Then processing logic determines the rank list of cores for thread A from the core rank map (processing block 306). The core rank map used may be specific to the workload. For example, if the workload is a high performance requirement workload, then the core rank map ranked list may list the cores in order of performance with the highest performing core at the beginning of the list and the lowest performing core at the end of the list.

Once the ranked list of cores has been obtained specific to the thread A workload, then processing logic sets a variable, which may be referred to as the "Current Core" at the top ranked core (processing block 308). The Current Core variable is simply an illustrative variable that works with one method of traversing through the list of cores. Next, processing logic determines if the Current Core is idle by checking the core utilization statistics provided by a particular metric stored in the usage counters (processing block 310). The Current Core is determined to be idle if the metric is below a low end busy threshold count. If the Current Core is idle, then the thread may be scheduled on the Current Core and processing logic returns the Core ID of the Current Core to the OS (processing block 312). Thus, the OS would know the core ID of the core to schedule the thread on.

If the current core is not idle and is running thread B, then processing logic calculates the migration cost of thread A and thread B if a migration were to take place. This cost takes into account a number of factors which include, but are not limited to, the average time it takes for each of thread A and thread B to migrate, the workloads of each thread, the priority of each thread, the Current Core's relative rank in each thread's rank list (in the embodiments that have core rank maps per thread), and potentially other factors. Using the thread priority example, processing logic determines if the thread currently scheduled on the Current Core (thread B) has a lower priority than thread A. If thread B has a lower priority than thread A, then that priority level discrepancy may weigh into the decision whether to remove thread B from the Current Core to defer to thread A.

Next, processing logic determines, based on the calculated migration costs from block 314, whether the benefit of migrating thread A to the Current Core outweighs the cost (processing block 316). If the benefit outweighs the cost, the processing logic returns the Core ID of the Current Core to the OS (processing block 312).

Otherwise, if the migration cost outweighs the benefit, then processing logic determines if the Current Core is the last core in the ranked list (processing block 318). If the Current Core is the last core, then the traversal of the rank list has completed and no viable core has been found. At this point processing logic may return a special value signifying this situation to the OS (processing block 320). If the Current Core is not the last core, then processing logic increments Current Core to the next core on the rank list and the process returns to block 310.

Additionally, if block 312 is reached and there is a thread B currently scheduled on the Current Core, then in many embodiments the entire process would need to be repeated to find thread B another core to be scheduled on.

Thus, embodiments of an apparatus, method, and system for providing hardware support for thread scheduling on multi-core processors are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

We claim:

1. A method, comprising:
scheduling a first thread to run on a first core of a multi-core processor, wherein the determination as to which core of the multi-core processor is the first core the first thread is scheduled on employs
ranking all cores of the multi-core processor specific to a workload of the first thread,
establishing a current utilization of each core of the multi-core processor, and
calculating an inter-core migration cost for the first thread, wherein the calculating the inter-core migration cost for the first thread includes tracking an individual cost of each of a plurality of inter-core migrations for the first thread and averaging the individual cost among the plurality of migrations.

2. The method of claim 1, wherein the ranking includes pre-establishing a ranked list of all cores in the multi-core processor, wherein the ranked list is based on a first metric.

3. The method of claim 1, wherein the establishing the current utilization includes counting a first activity for the first core dynamically during operation of the multi-core processor.

4. The method of claim 3, further comprising counting at least two activities and calculating a metric using the at least two activities, the calculated metric determining the current utilization.

5. The method of claim 3, further comprising:
receiving a thread scheduling query from an operating system;
sampling an activity count of the first core in response to the thread scheduling query;
reporting the activity count to the operating system; and
resetting the activity count.

6. The method of claim 1, wherein the inter-core migration cost includes an average number of clock cycles elapsed between a beginning of the inter-core migration of the first thread until the first thread begins executing on a new core.

7. The method of claim 6, wherein the inter-core migration cost is calculated separately for every thread running in the multi-core processor.

8. The method of claim 1, further comprising:
determining a benefit obtained by the first thread from migrating from a first core in the multi-core processor to a second core in the multi-core processor;
determining the inter-core migration cost imposed on the first thread from migrating from the first core to the second core; and
migrating the first thread from the first core to the second core if the benefit outweighs the inter-core migration cost.

9. The method of claim 8, further comprising:
determining the benefit and the inter-core migration cost associated with migrating the first thread from the first core separately to each of the one or more other cores in the multi-core processor; and
migrating the first thread from the first core to a one other core of the one or more other cores, the one other core having the greatest difference of the benefit being greater than the inter-core migration cost.

10. The method of claim 1, further comprising:
determining a benefit obtained by a second thread from running on the first core in the multi-core processor versus running on a second core in the multi-core processor;
determining the inter-core migration cost imposed on the first thread currently running on the first core from migrating from the first core to the second core; and
if the benefit outweighs the inter-core migration cost, migrating the first thread from the first core to the second core and scheduling the second thread on the first core.

11. A multi-core processor, comprising:
a core rank map to rank all cores of the multi-core processor specific to one or more thread workloads;
one or more usage counters to determine a current utilization of each core of the multi-core processor;
a thread migration cost counter to calculate an inter-core migration cost for the first thread by tracking an individual cost of each of a plurality of inter-core migrations for the first thread and averaging the individual cost among the plurality of migrations; and
scheduling logic to schedule the first thread to run on a single core of the multi-core processor, the scheduling logic to employ at least the core rank map, first of the one or more usage counters, and the thread migration cost counter to determine which core in the multi-core processor will be the single core to schedule the thread on.

12. The multi-core processor of claim 11, wherein the core rank map includes first pre-established ranked list of all cores in the multi-core processor, wherein the first ranked list is based on a first metric.

13. The multi-core processor of claim 11, wherein the one or more usage counters are further operable to count a first activity for the first core dynamically during operation of the multi-core processor.

14. The multi-core processor of claim 13, wherein the one or more usage counters are further operable to count at least two activities and the scheduling logic is further operable to calculate a metric using at least two activities, the calculated metric to determine the current utilization.

15. The multi-core processor of claim 13, wherein the scheduling logic is further operable to:
receive a thread scheduling query from an operating system;
sample an activity count of the first core by reading a current count from first of the one or more usage counters in response to the thread scheduling query;
report the activity count to the operating system; and
reset the current count of the first of the one or more usage counters.

16. The multi-core processor of claim 11, wherein the inter-core migration cost includes an average number of clock cycles elapsed between a beginning of the inter-core migration of the first thread until the first thread begins to execute on a new core.

17. The multi-core processor of claim 16, wherein the thread migration cost counter is further operable to calculate the inter-core migration cost separately for every thread running in the multi-core processor.

18. The multi-core processor of claim 11, wherein the scheduling logic is further operable to:
determine a benefit obtained by the first thread from migrating from a first core in the multi-core processor to a second core in the multi-core processor;
determine an inter-core migration cost imposed on the first thread from migrating from the first core to the second core; and
migrate the first thread from the first core to the second core if the benefit outweighs the inter-core migration cost.

19. The multi-core processor of claim 18, wherein the scheduling logic is further operable to:
determine the benefit and the inter-core migration cost associated with migrating the first thread from the first core separately to each of the one or more other cores in the multi-core processor; and
migrate the first thread from the first core to a one other core of the one or more other cores, the one other core having the greatest difference of the benefit being greater than the inter-core migration cost.

20. The multi-core processor of claim 11, wherein the scheduling logic is further operable to:
determine a benefit obtained by a second thread from running on the first core in the multi-core processor versus running on a second core in the multi-core processor;
determine the inter-core migration cost imposed on the first thread currently running on the first core from migrating from the first core to the second core; and
if the benefit outweighs the inter-core migration cost, migrate the first thread from the first core to the second core and schedule the second thread on the first core.

21. A system, comprising:
a bus;
a system memory coupled to the bus;
a multi-core processor coupled to the bus;
a core rank map to rank all cores of the multi-core processor specific to one or more thread workloads, wherein the core rank map includes first pre-established ranked list of all cores in the multi-core processor, wherein the first ranked list is based on a first metric;
one or more usage counters to determine a current utilization of each core of the multi-core processor, wherein the one or more usage counters are operable to count a first activity for the first core dynamically during operation of the multi-core processor;
a thread migration cost counter to calculate an inter-core migration cost for the first thread by tracking an individual cost of each of a plurality of inter-core migrations for the first thread and averaging the individual cost among the plurality of migrations; and
scheduling logic to schedule the first thread to run on a single core of the multi-core processor, the scheduling logic to employ at least the core rank map, first of the one or more usage counters, and the thread migration cost counter to determine which core in the multi-core processor will be the single core to schedule the thread on.

22. The system of claim 21, wherein the scheduling logic is further operable to:
determine a benefit obtained by the first thread from migrating from a first core in the multi-core processor to a second core in the multi-core processor;
determine the inter-core migration cost imposed on the first thread from migrating from the first core to the second core; and
migrate the first thread from the first core to the second core if the benefit outweighs the inter-core migration cost.

23. The system of claim 21, wherein the scheduling logic is further operable to:
determine a benefit obtained by a second thread from running on the first core in the multi-core processor versus running on a second core in the multi-core processor;
determine the inter-core migration cost imposed on the first thread currently running on the first core from migrating from the first core to the second core; and
if the benefit outweighs the inter-core migration cost, migrate the first thread from the first core to the second core and schedule the second thread on the first core.

* * * * *